United States Patent Office 3,492,690
Patented Feb. 3, 1970

3,492,690
MACHINES FOR MANUFACTURING HOLLOW
BODIES FROM PLASTICS
John E. Goldring, Petersfield, Michael Hughes, Barnet Lane, and Michael Harcourt Christians Buttery, Banstead, England, assignors to Cope Allman International Limited, London, England, a British company
Filed Mar. 7, 1967, Ser. No. 621,345
Claims priority, application Great Britain, Mar. 9, 1966, 10,264/66
Int. Cl. B29c 5/06
U.S. Cl. 18—5                                        4 Claims

ABSTRACT OF THE DISCLOSURE

In apparatus for forming bottles and like containers by forming a parison in an injection mould and transferring it on a core to a blow mould, the mechanism comprising the core and the moulds and the means for moving the core laterally to bring it into alignment with the one mould or the other is in the form of a self-contained tool unit with the core mounted on the sliding block on one plate and the moulds on another plate, the whole unit being designed as a tool for insertion in an orthodox injection moulding machine, fitting between the platens of the latter. As the core and blow mould move apart on completion of a cycle the blow mould is positively mechanically opened by this movement and neck moulds, where present, are also positively opened by this movement.

This invention relates to machines for manufacturing hollow bodies such as bottles and like containers from plastics. Various methods of producing such bodies are known, in which a so-called parison is first formed and then, while in a soft thermoplastic state, is expanded by air presure to fill a mould in which it is enclosed. Although the parison is commonly formed by extrusion of a tube, it is also known to form the parison by injection moulding and then to transfer the parison, still mounted on the core portion of the injection mould, to a blow mould in which air is admitted through the core to the interior of the parison to expand it out to fill the blow mould. This mould is then opened and the completed body is ejected. In one known machine for carrying out this method an injection mould cavity is flanked on opposite sides by two blow mould cavities and a sliding block carrying two cores is able to reciprocate in two perpendicular directions in a manner such that, while a parison is being injection-moulded on one core in the injection mould cavity, the parison already formed on the other core and still carried on it is being expanded in one of the two blow cavities. Other arrangements are known in which the block carrying the cores rotates intermittently instead of reciprocating linearly.

The primary aim of the present invention is to provide an improved form of machine of the general kind described above, but incorporating improvements which ensure its reliable and continued opreation over long periods. A further aim is to give flexibility in operation in that components are readily interchangeable for changing over production runs from one container to another.

According to the invention in its broadest aspect, there is now proposed a tool for use in a machine for producing hollow bodies of thermoplastic material by an injection moulding and blowing process, in which, on completion of the blowing step, the blow mould and a core carrying the completed body are moved mutually apart axially while the blow mould is simultaneously opened, distinguished by the feature that the positive opening of the blow mould is caused by a mechanical engagement of the blow mould be a part associated with the relatively moving core.

This positive opening of the blow mould, without reliance on springs, avoids any dangers of sticking after long periods of use. Where the neck of the hollow body is moulded in neck mould portions that move with the core and remain gripping the neck of the core until after completion of the blowing step, these neck mould portions are preferably likewise positively opened. This can be achieved by arranging that, as the core and the blow mould separate on opening of the tool, the neck portions at first stay with the core but after a predetermined travel they are held by means tied to the blow mould and thereafter the relative movement betwen cam surfaces associated with the core-carrying part and with the neck mould portions cause lateral opening movement of the latter.

The invention will now be further described by way of example with reference to the accompanying drawings, in which.

Figure 1:
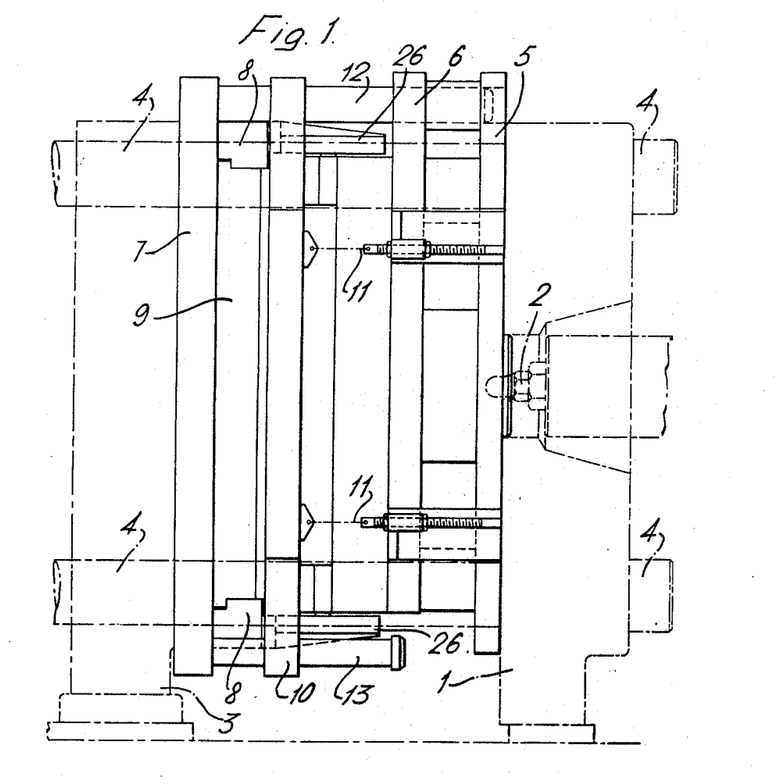
FIGURE 1 is a diagrammatic side elevation of a tool in accordance with the invention, mounted between the platens of a standard injection moulding machine.

An important feature of the design of machine according to the present invention is that it comprises basically a complete tool unit of standard overall dimensions designed to be inserted between the platens of an orthodox thermoplastic injection moulding machine. Referring first to FIGURE 1, the fixed platen of the machine is shown in broken lines at 1 and includes a nozzle 2 through which the molten thermoplastic material is injected into the tool from a heated supply (not shown) in a known manner. It is sufficient for an understanding of the present invention merely to know that material is injected via the nozzle 2 under the control of a timing device synchronised with the machine cycle.

The moving platen of the injection moulding machine is shown at 3 and is guided for horizontal movement under the action of a hydraulic ram (not shown) and away from the fixed platen on cylindrical tie bars 4 which are laterally clear of the tool.

The tool (which is shown in full lines) comprises a top plate 5, a further fixed plate 6 carrying the injection mould cavities and blow mould cavities, these plates carrying between them parts which incorporate feed passages and valves for controlling the flow of thermoplastic material, and a moving base plate 7 having guides 8 in which a sliding block 9 is mounted to be capable of reciprocating horizontal movement perpendicular to the plane of the drawing; this block carries the cores on which the parisons are first injection-moulded and then transferred to the blow moulds. Also visible in FIGURE 1 is a stripper frame 10 which will be explained later and which is tied to the fixed plate 6 by flexible chains 11 in such a manner that, as the tool opens, i.e. as the base plate 7 moves to the left, the stripper frame at first moves with it until, when the chains become taut, the stripper frame is held against further movement while the base plate continues to move. Finally, FIGURE 1 shows one or two main long guide pillars 12 projecting from the base plate 7 at the upper end of the tool only and entering guide apertures in the fixed plate 6 and top plate 5, and short guide pillars 13 projecting from the lower end of the base plate. These short pillars help to guide and support the stripper frame 10 but do not engage the fixed plate and it will be noted that, when the tool is fully open, these pillars are clear of the aperture between the plates and, as will become clear later, there is thus no obstruction to the completed containers dropping freely off the cores and downwards clear of the tool.

Turning now to FIGURES 2 to 6, the tool illustrated in these figures has four sets of cavities arranged one above the other, each set comprising a central injection mould cavity flanked by two blow mould cavities, one on each side. The injection mould cavities are in solid blocks 15 of metal, i.e. are not split (see FIGURE 5) whereas each blow mould cavity is split in a vertical plane through its axis, the two halves being formed in inserts 16 (FIGURE 5) mounted in vertically extending carriers 17 common to all four sets. These carriers 17 are guided to slide with respect to the fixed plate 6 on horizontal paths which are inclined to the axis of the machine and diverge outwardly in pairs so that in their retracted positions the carriers are in mutual contact and form cavities and in their advanced positions they are separated to allow the blown containers to be withdrawn on the cores. The guides are shown at 18 in the plan view of FIGURE 2. The means by which movement between these two positions is achieved will be described later.

Each of the four sets of cavities has associated with it two cores 19 (FIGURE 4) spaced apart horizontally on the sliding block 9. The cores are spaced apart by a distance equal to the distance between the injection mould and one of the adjacent blow moulds, and sliding block is capable of horizontal movement through the same distance by means of a pneumatic ram, part of which is visible at 20, at the right-hand side of FIGURE 4, carried on a bracket 21. In one end position of the block the one core is aligned with a first blow mould cavity and the other with the injection mould cavity and in the other end position the first-mentioned core is aligned with the injection mould cavity and the other core with the second blow mould cavity. The movement is facilitated by the fact that the block 9 is supported on rollers formed by ball races, one of which is visible at 9' in FIGURE 3.

Figure 3:
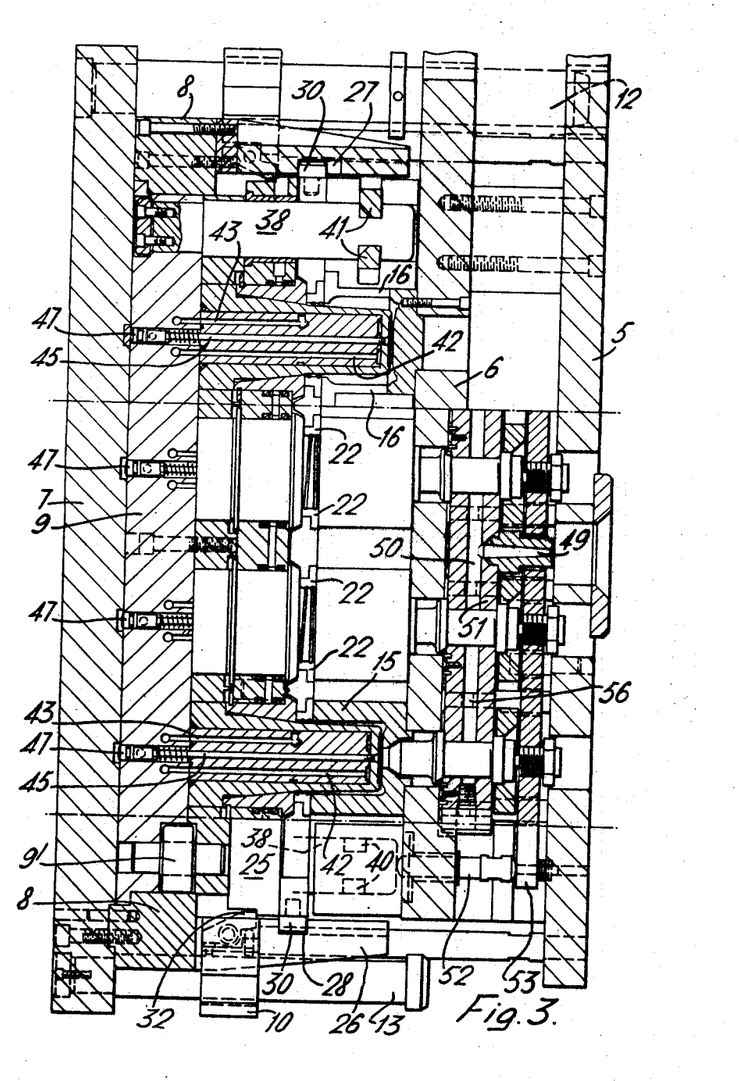
FIGURE 3 is a composite vertical section through the tool, taken partly in a plane containing the axes of the injection mould cavities and partly in a plane containing the axes of the blow mould cavities.

As will be seen in FIGURE 3, the neck portions of the containers, which in the example illustrated carry external screw threads, are not formed in the stationary cavity inserts 16 but in separate neck mould inserts 22 which are carried in neck mould carriers 23 and move with the moving part of the tool. These neck mould carriers, like the mould insert carriers 17, also move apart from one another in pairs, at least when the carriers in question are aligned with the blow moulds, in order to allow the completed containers to be removed. The carriers 23 are guided for linear lateral movement together and apart on screws 24 on a plate 25, which we call the stripper plate and which in the closed position of the tool, lies against the face of the sliding block 9 with the cores 19 protruding through it. There are two such stripper plates, one associated with each pair of neck mould carriers.

Figure 6A:
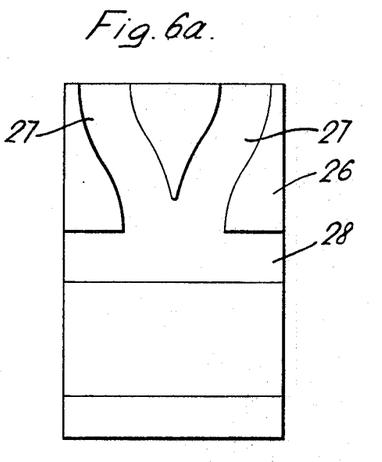
FIGURES 6a and 6b show the two forms of cam plate used for controlling the neck mould carriers when aligned with the blow mould cavities and the injection mould cavities respectively.
Figure 6B:
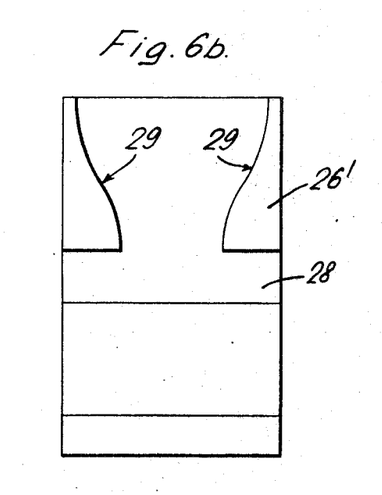

The movement of the neck mould carriers together and apart is controlled by cam plates 26 and 26' which protrude forward from the top and bottom of the base plate 7 being secured in fact to the guides 8. The form of these cam plates is shown in FIGURES 6a and 6b. The cam plates 26 each have a pair of sinuous slots 27, which come together at one end adjacent a transverse slot 28, and are disposed in alignment with the vertical planes that contain the blow mould cavities, while the plates aligned with the injection mould cavities are of the form shown at 26' and are similar but with the inner walls of the sinuous slots omitted, leaving only cam faces 29. These cam plates are engaged by pins 30 on the upper and lower ends of the neck mould carriers 23.

Spring-loaded balls (not shown) in the face of each stripper plate 25 engage shallow recesses 31 (FIGURE 4) in the back faces of the carriers 23 and thereby locate these carriers against inadvertent lateral movement, i.e. against movement other than that positively caused by the cam plates 26 and 26'.

Spring-loaded latches 32 (FIGURE 3) in the stripper frame 10 engage behind shoulders on that stripper plate 25 which is aligned with the blow mould cavities. As will be seen in FIGURE 4, the stripper frame comprises side bars 33 shaped to clear the laterally moving sliding block 9 and the tie bars 4 of the machine, and top and bottom bars 34 and 35 provided with bores to receive the upper long pillars 12 and the shorter bottom pillars 13 on which the frame slides.

Starting with the tool in the fully closed position shown in FIGURE 3, with the latches 32 engaging behind the one stripper plate 25, as the tool opens the stripper plate and the stripper frame both move to the left with the base plate 7 and sliding block 9, until the chains 11, which tie the stripper frame 10 to brackets 36 (FIGURE 5) on the stationary plate 6 become taut, whereupon the stripper frame and one stripper plate stop moving to the left but the base plate 7, carrying the cam plates 26 and 26', continues to move, together with the other stripper plate. The slots 27 in the cam plates 26 cause that pair of neck mould carriers 23 which is aligned with a row of blow mould cavities to move apart. The other pair of carriers 23, opposite the injection mould cavities, remains together and close to the block 9.

When the tool is fully open the sliding block 9 is shifted laterally by the ram 20 so that those carriers 23 which were previously aligned with a cam plate 26 now come into line with the cam plate 26', and those previously aligned with the cam plate 26' now come into line with the other cam plate 26. As the tool closes the faces 29 on the plate 26' close together the carriers that were then apart. The other pair of carriers, already closed together, remain together. It will be seen from FIGURE 2 that the sides 37 of the carriers 23 are tapered and engage tapered faces in the sliding block 9 to give a wedging action that ensures that the carriers 23, and hence the neck mould inserts 22, come snugly together in the closed position.

Figure 4:
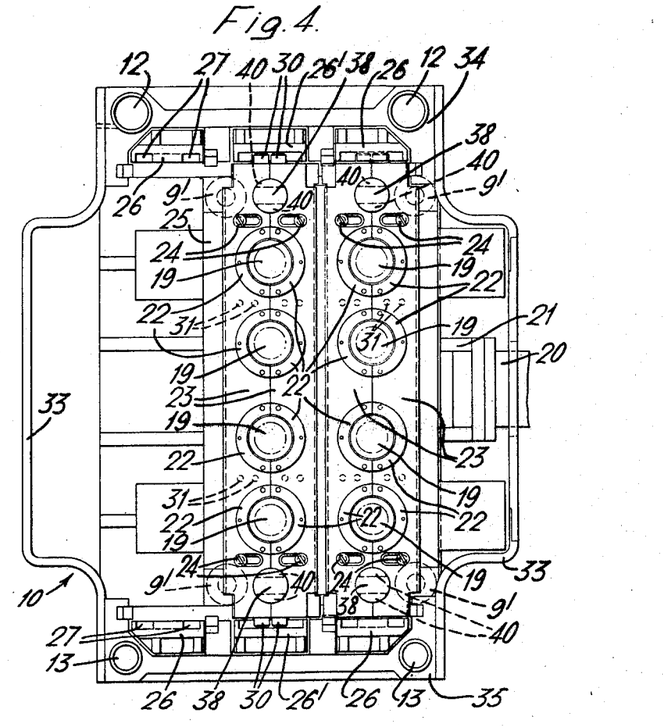
FIGURE 4 is an elevation of the sliding block looking along the axis of the machine from the right in FIGURE 1, and showing also the stripper plates and neck mould inserts and the stripper frame.
Figure 5:
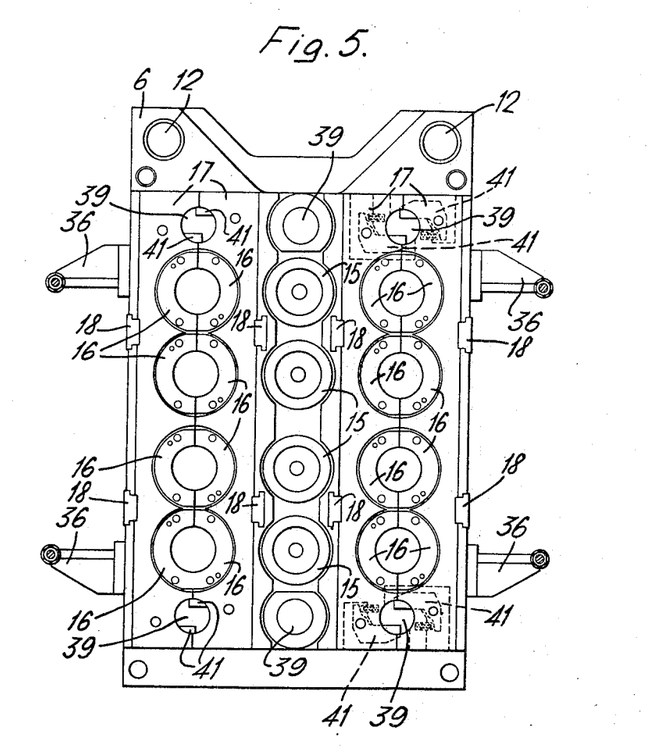
FIGURE 5 is an elevation of the stationary block carrying the injection mould and blow mould cavities, looking along the axis of the machine from the left in FIGURE 1.

We will deal now with the means for positively opening and closing the blow mould cavities. Referring to FIGURES 3, 4 and 5, four pillars 38 will be observed, projecting forwards from the sliding block 9, and passing through the upper and lower ends of the two pairs of neck mould carriers 23 and towards the stationary plate 6. As the tool closes these pillars, which have slightly rounded noses, enter openings 39 in the blow mould insert carriers 17 and in bosses on the stationary plate 6, and ensure exactly correct alignment between the cores and the injection and blow mould cavities which they are to enter. It is important to note that these pillars are long enough so that in the event of the sliding block 9 having failed to complete its full lateral travel while the tool was open, so that the cores are well out of alignment with the cavities, the noses of the pillars 38 will engage the faces of the carriers 17 before the cores can do so, and will thus prevent the tool closing and so protect the relatively expensive cores from damage. At the same time the pillars are short enough to withdraw completely clear of the region of the cavities when the tool is fully open, and so they do not interfere with the free fall of the completed containers.

Each pillar 38 has near its free end a pair of horizontal transverse slots 40. When the tool is fully closed these slots in that pair of pillars which at the time is aligned with the vertical plane of one of the rows of blow mould cavities are engaged by latches 41 in the upper and lower ends of the carriers 17 for that row. Then as the tool opens the pillars positively pull the carriers 17 forwards to open the blow moulds. As they come forwards, guided by the guides 18 (FIGURE 2), the carriers move apart and so the latches 41 move laterally clear of the slots 40, and the pillars can continue to withdraw, leaving the carriers 17 in the fully open position. On closure of the tool the carriers 17 normally remain fully open until they are positively closed by the engagement of the faces of the neck mould inserts 22 against the faces of the cavity inserts 16. As they close together, the latches 41 slide into the notches 40. The latches 41 are shown as being pivoted and spring-loaded, but neither of these is essential, being provided only as a safety precaution to allow for the possibility of the carriers 17 being moved to the closed position before the pillars 38 have entered the holes 39, in which case the rounded noses of the pillars would push the latches aside.

We turn now to the cores 19. As shown in FIGURE 3, these are of composite construction comprising an outer shell and a cylindrical inner body fitting into it, and the inner body has axially extending passages 42 and 43 for the flow and return of a temperature-controlling fluid which flows from the passage 42 into an annular space close under the head of the core and thence down several axially extending grooves (shown at 44 in FIGURE 2) in the outside surface of the inner body to a further annular space from which it passes to the passage 43. The temperature-controlling fluid, which may be oil, water or air, flows through galleries formed by internal drillings in the sliding block 9, being fed from a supply connected to the block through flexible pipes. The purpose of the fluid is to keep the temperature of the core within the desired close limits. To avoid its presence in the block 9 giving rise to thermal expansion problems we may line the galleries in this block with a material of low thermal conductivity, for example by inserting tubing of nylon or other plastics. A temperature-controlling fluid may also be circulated in the mould cavity blocks.

The root of each core 19 comprises a tapered portion that engages in a tapered bore in an insert in the associated stripper plate 25, ensuring correct location of the stripper plate on the core and thus indirectly helping to ensure correct location of the neck mould inserts 22 with respect to the core.

Down the centre of the core 19 passes the stem 45 of a spring-loaded poppet valve which controls the admission of air to the interior of the parison for blowing. The valve head is in the tip of the core. The air under pressure is supplied through a gallery 46 (FIGURE 2), drilled in the sliding block 9 and the timing of its opening is given by a tappet 47 which protrudes very slightly proud of the rear face of the sliding block 9 and is engaged by a ramp 48 on the base plate 7 (FIGURE 2) at the end of the lateral travel of the block 9. In this way the air supply is automatically connected to each core as it reaches that position where it is aligned with its associated blow mould, but not when it is aligned with the injection mould. The actual admission of air via the gallery 46 is controlled by separate timing means (not shown).

The thermoplastic material from the nozzle 2 (FIGURE 1) enters via a nipple 49 (FIGURE 3) to be distributed by a gallery 50 in a so-called hot runner block 51 to the four individual injection nozzles to the respective injection molds. A further function of the pillars 38 is to open the valves preparatory to injection of the plastic material and for this purpose the ends of the pillars engage tappets 52 (FIGURE 3) in those holes 39 which they enter above and below the row of injection moulds. This occurs as the tool completes its closing movement and the tappets 52 lift a valve plate 53 (FIGURES 2 and 3) that withdraws valve pins 54 in the individual nozzles and allows the thermoplastic material to enter the injection moulds. As the tool opens the valve plate 53 is returned to its rest position by springs (not shown) and the valves are also closed by springs in the form of Belleville washers 55. In an alternative arrangement the valves 54 are opened by hydraulic instead of mechanical means.

There are special provisions for preventing thermal expansion of the hot runner block 51 (which has to be kept hot by electric cartridge heaters to maintain the plastic in a fluid condition) from distorting or misaligning the individual nozzles. Firstly the hot free to expand upwards and downwards, and is located axially by pins 56 on it, which are in sliding engagement with the faces of the plates 5 and 6. Secondly the rear end of each nozzle is independently located by a plate 57 (FIGURE 2) mounted in trunnions 58 from the top plate 5; the front ends of the nozzles are located in the plate 6 and also in the injection cavity bodies 15.

Figure 2:
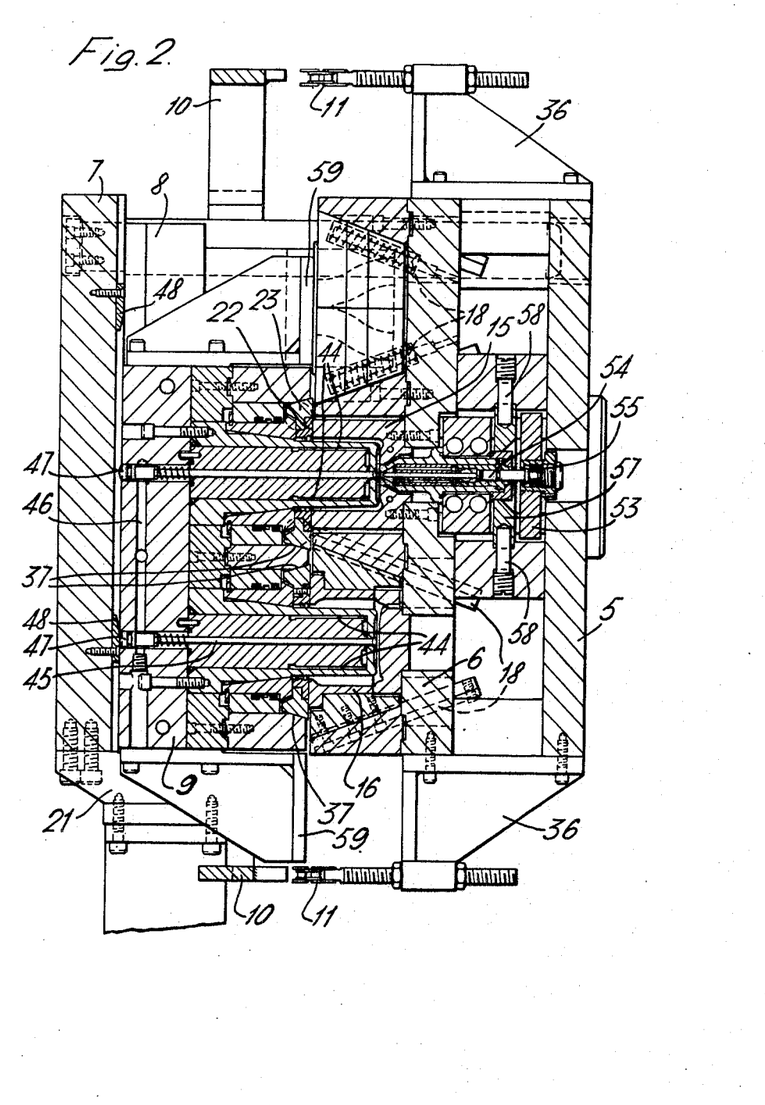
FIGURE 2 is a composite horizontal section through the tool, mostly taken in a plane containing the axes of the cores and mould cavities.

The operation of the tool illustrated in FIGURES 2 to 6 will largely be clear from the foregoing description but the following review may be helpful. Starting with the tool in its fully closed position, as shown in FIGURES 1, 2 and 3, a parison has just been injection moulded between each mould 15 and the co-operating core 19, and the injection nozzles are open. A previously moulded parison has been expanded in each of one row of blow moulds. The other row of blow moulds is idle at the time, but is covered, to prevent damage, by an extension plate 59 on the sliding block 9 (FIGURE 2).

As the platen 3 (FIGURE 1) starts to move to the left to open the tool, the injection nozzles close under the action of the Belleville washers as one pair of the pillars 38 moves away from the tappets 52, and the other pair of pillars 38, acting through the latches 41, pull the blow mould carriers 17 forwards and apart until they are apart sufficiently far for the latches to be clear of the pillars. As the tool continues to open the newly moulded parisons and the newly blown containers remain in their respective cores, moving with them and held firmly by the neck mould inserts 22. At this time the frame 10 is moving with the other moving parts 7, 9 and 25. When the chains 11 become taut the frame 10 stops, halting also the stripper plate 25, and those neck mould carriers 23 which are opposite the blow moulds, hence halting also the newly blown containers. The cores 19 continue to withdraw, and those which carry the newly moulded parisons still carry those parisons with them, the associated neck moulds and carriers remaining closed.

By the time the tool is fully open the neck moulds, opened by the cam plates 26, have released the newly blown containers, the cores 19 have withdrawn completely clear of them, and the containers now drop freely, under gravity, clear of the tool. The lower pillars 38 and the short pillars 13 are likewise clear of the region in which the containers drop, so there is no danger of the free fall of the containers being obstructed.

While the tool is fully open the pneumatic ram 20 is automatically actuated to traverse the sliding block 9 so that those cores which carry the newly moulded parisons are now aligned with the previously idle blow moulds and the other cores now empty, come into line with the injection moulds. The air valves in the cores carrying the parisons are opened by the ramps 48. During the traversing movement the pins 30 of the closed carriers 23 on the parison-carrying cores slide through the clearance slot 28 in the cam plates.

As the platen 3 now moves forward to close the tool the neck moulds around the empty cores are closed by the action of the cam surfaces 29 on the other cam plates 26', and the stripper plate 25 associated with the parison-carrying cores rides over the latches 32 on the frame 10, after which the frame is picked up and moved to the right with the remainder of the moving parts. The four pillars 38 enter their respective holes in the bushes in the plate 6, and then the cores enter their respective cavities, those which enter the blow cavities having the moulded parisons on them. During the final part of the closing movement of the tool the neck mould carriers 23 and their inserts 22 engage the open cavity mould carriers 17 and inserts 16, closing them and finally the ends of one pair of the pillars 38 engage the tappets 62 to lift the valve plate 53 and admit fresh material to the injection moulds. Air is admitted by separate control means (not shown) to the interiors of the parisons in the blow moulds via the gallery 46 in the sliding block.

It will be understood that the whole cycle is repeated continuously and automatically under the control of appropriate timers and limit switches.

Figure 7:
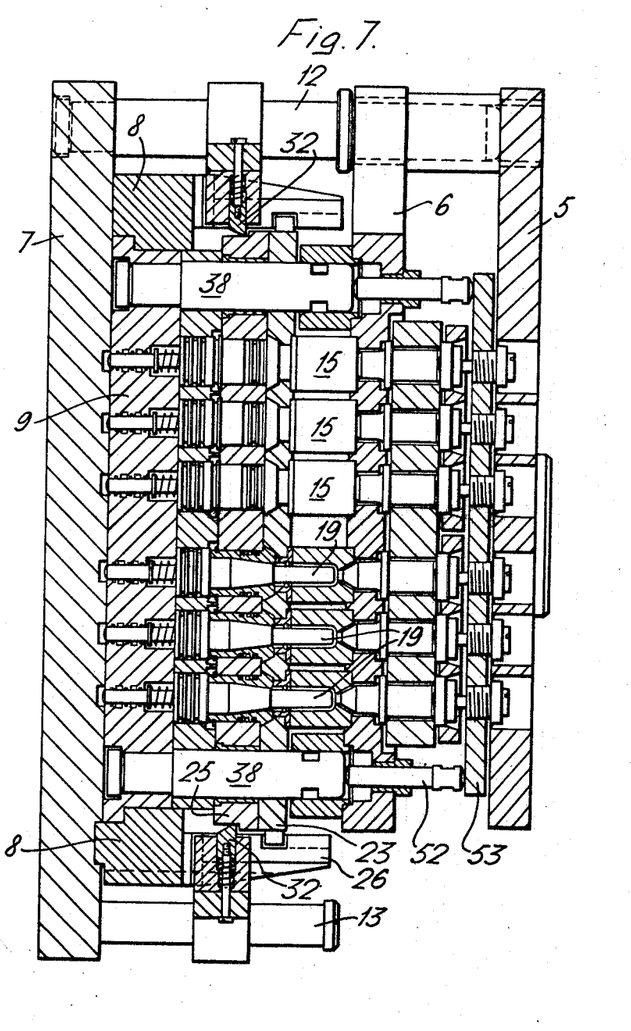
FIGURE 7 is a diagrammatic partially sectioned side elevation similar to FIGURE 3 but showing an alternative tool having the same overall dimensions as the tool of FIGURES 2 to 6 but designed to produce a larger number of containers of smaller size.

An important feature to note in the tool described is the ease with which a change may be made from one shape of container to another. It is normally only necessary to change the injection cavity block 15, the blow cavity inserts 16, the neck mould inserts 22 and the cores 19 and stripper ring inserts in the stripper plates. In some cases the cores and the injection cavity blocks could remain unchanged. Thus a given tool can cover a range of sizes and shapes of container. The arrangement illustrated for the stripper frame 10 also makes it easy to alter the timing of the stripping process during the opening part of the cycle, simply by adjustment of the chains 11 on the brackets 36.

Where containers outside this range are required, it is possible, instead of making a tool of larger or smaller overall dimensions, to use one of the same overall dimensions but having a smaller or larger number of injection and blow cavities. For example, where larger containers are required than can be produced in the four-mould tool of FIGURES 2 to 6, a tool could be made with the same outside dimensions but only three, two or even one set of moulds instead of four. Likewise, where smaller containers are required, they could obviously be made with the tool of FIGURES 2 to 6 but greater output could be obtained by increasing the number of sets of moulds. FIGURE 7 illustrates a tool of the same overall dimensions as that of FIGURES 2 to 6 but with a total output of twelve containers per cycle instead of four. Not only are there six sets of moulds instead of four, but in addition, although not evident from the elevation illustrated, each set comprises two injection moulds and three blow moulds arranged alternately, instead of one injection mould and two blow moulds. Each set has four cores instead of two and so there are twenty-four cores altogether. The cycle is exactly the same but two completed containers are produced in each set in each cycle instead of one.

The advantage of this modular construction of the tools is not only that it allows an economy in parts in that many of the parts can be identical in different tools, but, more important, that a user can equip himself with only one injection moulding machine and can have two or three tools available, inserting the appropriate one in the machine for a production run of containers of a given size and then exchange it for another tool when a run of differently-sized containers is required. This is facilitated by the fact that the tool is a complete assembled unit in itself, held together by its pillars 12, and can be dropped between the platens 1 and 3 from above or inserted from the side with the minimum of trouble. Even with a given tool, the user can make production runs of different containers within a limited range of sizes by simply changing the cavity inserts, neck inserts, stripper rings and cores, which can be done without dismantling the tool. A further advantage is that the user can use the machine for normal injection moulding of other articles when the production of containers is not required.

On a world-wide basis, producers in different countries can each be equipped with a limited number of injection-moulding machines, the number being dependent on the size of the local market, and with a range of sizes of tools, and the actual inserts and cores, of closely controlled standard external dimensions, can be circulated from country to country and used for production runs as the demand occurs, so that a wide range of containers can be produced locally in each country or area, close to the region of consumption (e.g. alongside a factory that makes the product to fill them) without the individual producers being involved in heavy tooling costs.

A further possibility is to make the tools of different heights, able to accept different numbers of sets of moulds of the same basic size range. For example a tool similar to that illustrated in FIGURES 2 to 6 could be made of about half of the height of the one illustrated and containing only two sets of mould cavities instead of four. In such a case we would make the sets separable, i.e. in the tool illustrated the various carriers and core-supporting blocks would be divided into four along horizontal planes. Then the same basic tool sets could be used in different members in tools of different sizes. For example, in a region with only a small market potential one would use a small injection moulding machine in conjunction with a tool taking only two sets, whereas in a larger market one might use tools tall enough to take six such sets, all of the same horizontal dimensions. Again there is economy in tooling in that a given organization could circulate the cavity and core sets to the different countries in accordance with their needs.

What is claimed is:

1. Apparatus for forming hollow bodies from thermoplastic material comprising a tool in the form of a self-contained unit comprising a base plate, a top plate parallel to said top plate, guide means guiding said base plate and top plate for mutual relative movement along a first axis perpendicular to the planes of said plates, a sliding block, said block being mounted on said base plate for lateral sliding movement along a second axis perpendicular to said first axis, an injection mould and a blow mould disposed side by side on said top plate, means defining a nozzle capable of passing thermoplastic material to said injection mould, a core disposed on said sliding block and adapted to co-operate selectively with said injection mould and said blow mould according to the position of said sliding block, and power means adapted to cause movement of said block with respect to said base plate, and means for admitting fluid under pressure to said blow mould, said unit being adapted for insertion between the platens of an injection moulding machine with movement of the platens being transmitted to said base plate and top plate to cause said mutual relative movement.

2. A tool according to claim 1 including a further injection mould on said top plate, spaced from said first-mentioned injection mould, and wherein said nozzle-defining means comprise a single inlet adapted to receive molten thermoplastic material from a machine in which said tool is inserted, separate first and second nozzle means aligned respectively with said two injection moulds, and a linear gallery connecting said inlet to said respective nozzle means, said gallery being located at said inlet but free to move under thermal expansion at said first and second nozzle means.

3. Apparatus for forming hollow bodies from thermoplastic material comprising a base plate, a guide on said base plate, a top plate slidable towards and away from said base plate along a first axis, a sliding block slidable laterally with respect to said base plate along a second axis perpendicular to said first axis, an injection mould on said top plate, a blow mould on said top plate, a core on said sliding block capable of being brought selectively into alignment with said injection mould and said blow mould, said blow mould being defined by two mutually separable mould sections guided for outward divergent movement towards said sliding block, and disengageable latching means on said sliding block, capable of latching into said mould sections such that, on initial movement apart of said top plate carrying said moulds and said base carrying said sliding block and core, said latching means engage said mould sections and move said mould sections with said core away from said top plate.

4. Apparatus as set forth in claim 3 wherein said disengageable latching means comprise a pillar mounted on said sliding block and extending towards said blow mould to enter a cavity in said blow mould section, disengagement being effected by the lateral component of movement of said blow mould sections imposed by their divergent guiding.

References Cited

UNITED STATES PATENTS

Re. 26,265   9/1967   Farkas.

FOREIGN PATENTS 781,560   8/1956   Great Britain.
652,960   2/1963   Italy.

WILBUR L. McBAY, Primary Examiner

U.S. Cl. X.R.

264—97